UNITED STATES PATENT OFFICE.

LUDWIG MOND, OF NORTHWICH, COUNTY OF CHESTER, ENGLAND.

PROCESS OF MAKING HYDROCHLORIC ACID.

SPECIFICATION forming part of Letters Patent No. 308,511, dated November 25, 1884.

Application filed January 9, 1884. (No specimens.)

*To all whom it may concern:*

Be it known that I, LUDWIG MOND, residing in Northwich, county of Chester, Kingdom of Great Britain and Ireland, have invented a new and useful method of obtaining muriatic acid, as well as the acid and neutral sulphates of ammonia, from chloride of ammonium, of which the following is a specification.

If chloride of ammonium is treated with sulphuric acid in the way in which other alkaline chlorides are treated for obtaining the hydrochloric acid therefrom—viz., with the quantity of sulphuric acid necessary to form the neutral sulphate—the chloride of ammonium is not completely decomposed, as are the other alkaline chlorides, and a portion only of the hydrochloric acid it could yield is given off. The resulting residue is acid, and on heating this residue to a high temperature dense vapors of chloride of ammonium are given off.

In order to obtain from chloride of ammonium all or nearly all the hydrochloric acid it can yield, and also to obtain from the residue neutral sulphate of ammonia, I proceed as follows: I treat the chloride of ammonium with an excess of sulphuric acid—say with double the quantity necessary to form the neutral sulphate—and heat the mixture until all or nearly all the hydrochloric acid is disengaged. This operation can be performed at a moderate temperature—say 250° centigrade—without volatilizing any ammonia. The liquid residue, consisting of acid sulphate of ammonia, is drawn off from the receptacle in which the operation has been conducted, and after it has become solid on cooling it is broken in pieces.

In order to prepare the neutral sulphate of ammonia, the liquid acid sulphate is treated with ammoniacal gases such as are obtained by the distillation of the ammoniacal liquors of gas-works or of other origin; or the solidified acid sulphate broken into lumps is exposed to the action of such ammoniacal gases in chambers, which are preferably arranged in series, so as to allow of methodical working; or the neutralization may be effected by adding to the acid salt a solution of ammonia, of ammonia carbonate, or other easily-decomposable ammoniacal salts. In the latter case the resulting solution must be evaporated.

I claim as my invention—

The process of producing muriatic acid and acid sulphate of ammonia by treating chloride of ammonium with an excess of sulphuric acid, substantially as hereinbefore described.

In testimony whereof I have signed my name to this specification in the presence of two subscribing witnesses.

LUDWIG MOND.

Witnesses:
HCH. SPRINGMANN,
B. ROI.